Sept. 12, 1950

L. M. POTTS 2,522,461

MECHANICAL CHAIN LINKAGE SYSTEM FOR
MECHANICAL CIPHERING UNITS

Filed Oct. 10, 1946

INVENTOR
LOUIS M. POTTS, DECEASED
MARTHA W. C. POTTS, EXECUTRIX

BY Emery Robinson
ATTORNEY

Sept. 12, 1950 — L. M. POTTS — 2,522,461
MECHANICAL CHAIN LINKAGE SYSTEM FOR MECHANICAL CIPHERING UNITS
Filed Oct. 10, 1946 — 9 Sheets-Sheet 2

INVENTOR
LOUIS M. POTTS, DECEASED
MARTHA W. C. POTTS, EXECUTRIX
BY Emery Robinson
ATTORNEY.

Sept. 12, 1950

L. M. POTTS 2,522,461

MECHANICAL CHAIN LINKAGE SYSTEM FOR
MECHANICAL CIPHERING UNITS

Filed Oct. 10, 1946

INVENTOR
LOUIS M. POTTS, DECEASED
MARTHA W. C. POTTS, EXECUTRIX

BY *Emery Robinson*
ATTORNEY

L. M. POTTS 2,522,461

MECHANICAL CHAIN LINKAGE SYSTEM FOR
MECHANICAL CIPHERING UNITS

Filed Oct. 10, 1946

INVENTOR
LOUIS M. POTTS, DECEASED
MARTHA W. C. POTTS, EXECUTRIX

BY Emery Robinson
ATTORNEY

Sept. 12, 1950 L. M. POTTS 2,522,461
MECHANICAL CHAIN LINKAGE SYSTEM FOR
MECHANICAL CIPHERING UNITS
Filed Oct. 10, 1946 9 Sheets-Sheet 8

INVENTOR
LOUIS M. POTTS, DECEASED
MARTHA W. C. POTTS, EXECUTRIX
BY Emery Robinson
ATTORNEY Sept. 12, 1950        L. M. POTTS        2,522,461
MECHANICAL CHAIN LINKAGE SYSTEM FOR
MECHANICAL CIPHERING UNITS Filed Oct. 10, 1946        9 Sheets-Sheet 9

INVENTOR
LOUIS M. POTTS, DECEASED
MARTHA W. C. POTTS, EXECUTRIX
BY *Emery Robinson*
ATTORNEY.

Patented Sept. 12, 1950

2,522,461

UNITED STATES PATENT OFFICE 2,522,461

MECHANICAL CHAIN LINKAGE SYSTEM FOR MECHANICAL CIPHERING UNITS

Louis M. Potts, deceased, late of Evanston, Ill., by Martha W. C. Potts, executrix, Evanston, Ill., assignor to Teletype Corporation, Chicago, Ill., a corporation of Delaware Application October 10, 1946, Serial No. 702,429

4 Claims. (Cl. 178—22)

This invention relates to secret printing telegraph apparatus and particularly to mechanical cipering units for enciphering and deciphering telegraph messages.

The primary object of the invention is the provision of mechanical ciphering units for secret telegraph message communication.

Another object of the invention is to provide a mechanical ciphering unit including a mechanical chain linkage system in which variable paths of movement through the linkage are afforded for ciphering operations.

An additional object of the invention is the incorporation of a mechanical ciphering chain system in a type wheel printer.

A further object of the invention is the provision of mechanical chain ciphering means for use in conjunction with a regenerative repeater.

A feature of the invention is to provide a ciphering type wheel printer which is all mechanical in operation and requires no motor, all power being furnished from the keyboard.

In general, it is proposed to provide, in combination with a five unit code selector which includes five mechanical selectable elements positionable to two different positions, a variable mechanical chain for each selectable element. The positions of certain component parts of the chains are varied so that motion transmitted through the individual chains follows a variable path which ultimately determines the positions occupied by the selectable elements. To achieve such a result each mechanical chain includes a plurality of pairs of slides which cooperate with a plurality of pairs of ciphering levers whose positions are determined by the setting of cam pairs of ciphering code drums which may be stepped to a number of different positions. The code drum cams are cut so that the high parts of one cam are opposite the low parts or notches of the companion member of the same pair of cams. This insures that the ciphering levers of any pair will always be oppositely positioned for operation to provide a continuous path of movement through the mechanical chains as will be more fully described later in the specification.

One embodiment of the invention utilizes mechanical ciphering chains in connection with a keyboard operated type wheel printer. The stopping position of the type wheel is determined by the selection of a stop pin, by means of a five unit code disc selector similar to the selector disclosed in the Morton et al. Patent No. 1,821,110. The positioning of the code discs is determined by the operation of the mechanical ciphering chains, there being one chain for each element of the code. In this instance, an enciphered message can be typed on a tape and then sent by telegraph, courier, or other means to a predetermined destination. An attendant at this destination by employing an identical type wheel printer may retype the received message which will then be deciphered and printed in plain English. It is, of course, assumed that both type wheel printers would be provided with identically cut key code drums which will occupy the same relative positions during the enciphering and deciphering operation. An additional advantage of the type wheel printer herein disclosed is that its operation is all mechanically controlled from the keyboard and requires no motor.

A second embodiment of the invention which is applied to a regenerative repeater contemplates the use of mechanical chains slightly different in construction than the one used with the type wheel printer. The regenerative repeater is of the type disclosed in the patent of L. M. Potts, No. 2,403,679. The mechanical chains determine the positions of five code bars which sequentially combine with the armature of a selector magnet to determine whether a regenerative repeater contact will move to its marking or spacing position.

A better understanding of the invention may be had by reference to the detailed description which follows when read with the accompanying drawings wherein.

Figures 5, 6, 7:
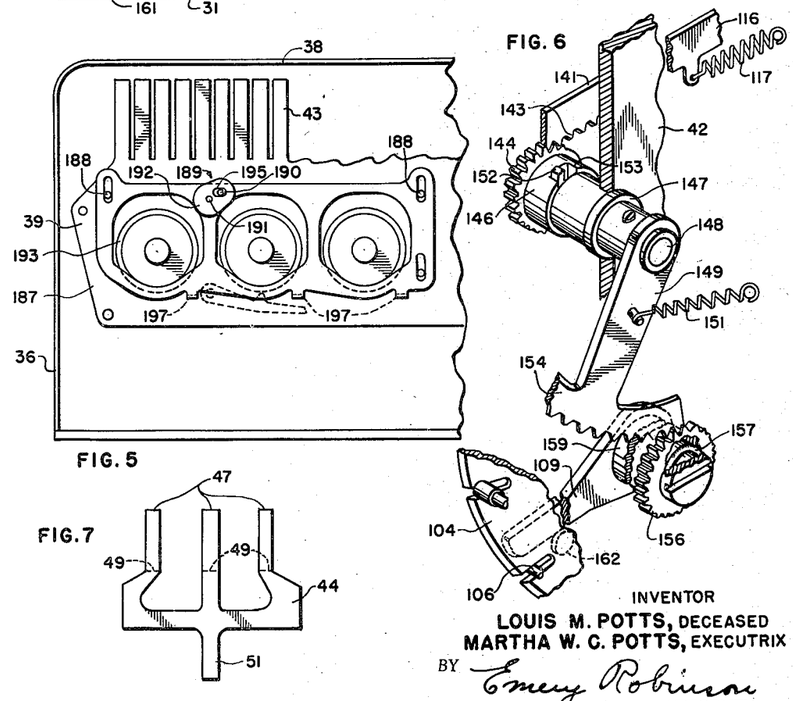
Fig. 5 is a partial front view of the apparatus showing particularly the locking plate for the ciphering code drums.
Fig. 6 is an enlarged detailed perspective view of the mechanism for operating the type wheel.
Fig. 7 is an enlarged detail view of a key slide blank.
Figure 8:
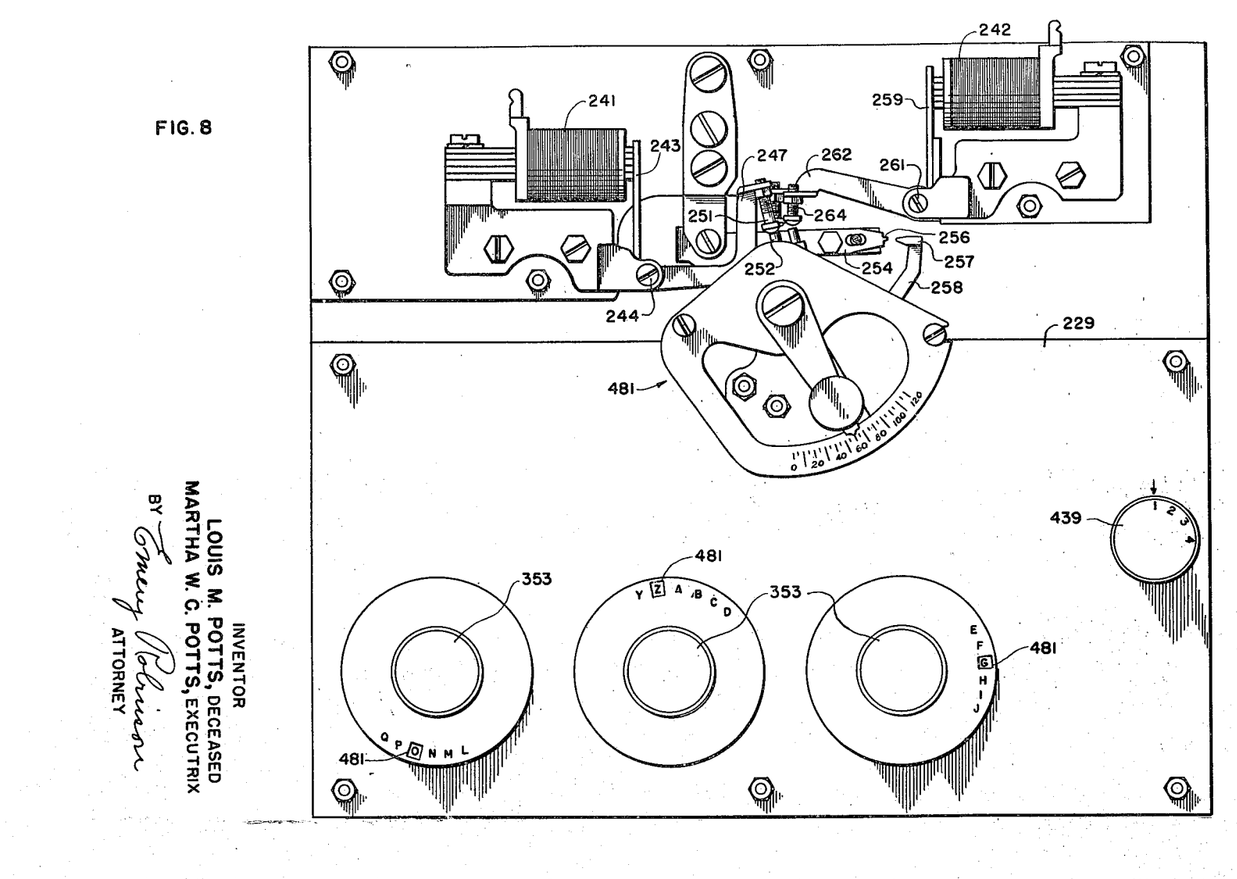
Fig. 8 is a front elevational view of the embodiment of the invention devoted to the ciphering regenerative repeater.

Referring now to Figs. 1 to 7 inclusive, the embodiment of the invention which is devoted to the type wheel printer will now be described. Referring to the parts by reference numerals, 31 represents the base of the apparatus upon which is supported in any suitable manner a housing 32 composed of front and rear walls 33 and 34, respectively, end walls 36 and 37, and a top portion 38. Within the housing 32 are mounted a front supporting member 39, an intermediate supporting member 41 secured to member 39 by means of bolts 25, and a rear supporting member 42 integrally formed as part of the front supporting member 39 in a slotted guide 43 (Fig. 5). Similarly the rear supporting member 42 is provided with a slotted guide, not shown, and between it and the slotted guide 43 are mounted for slidable vertical movement a series of key slides 44 normally urged to an upward position by associated springs 46. All the key slides 44 may be cut from the same blank as shown in Fig. 7 by cutting off the undesired upward projections 47 according to the row of keyboard 48 in which it is desired to place the particular key slide. For example, if it were desired to make a particular key slide 44 operable from the front row of keyboard 48 the middle and rear upward projection 47 would be cut off at 49. The key slides 44 also include a centrally located and downwardly depending portion 51, designed to move in a lower guideway 52 which is suitably attached to the intermediate supporting member 41, while the middle upwardly extending projection 49 is designed to ride in the upper guideway 50 also mounted on member 41. Keyboard 48 is provided with the usual space bar 53 pivoted on each side at 54 and normally urged in an upward direction by springs, not shown.

Mounted below the key slides 44 for horizontal slidable movement on rods 56 and 57 are five pairs of permutation bars 58F, 58R. Each pair of permutation bars is composed of a front bar 58F and a rear bar 58R, the front bars 58F being normally urged to the right as viewed in Fig. 2 by means of springs 59F, while the rear bars 58R are similarly urged to the right by springs 59R. The permutation bars 58F, 58R are respectively provided with upwardly extending beveled cam projections 61F and 61R designed to be engaged by the lower edges of key slides 44 and are so arranged that for any given pair of bars 58F and 58R only one of the pair will move to the left when a key slide 44 is depressed. In other words, where there is a projection 61F on a bar 58F there will be no projection 61R at a similar point on bar 58R of the same pair and vice versa.

It will be understood that although the operation of only one mechanical chain will now be described there will be a similar chain for each element of the five unit code. Each of the permutation bars 58R, 58F is provided near its left end (as viewed in Fig. 2) with a notch 62, in which the upper arms 63F, 63R of a pair of operating levers 64F, 64R pivoted at 66 are nested. Operating lever 64F is designed to engage at its lower end a rearwardly extending lug 67F of slide 68F while operating lever 64R is designed to engage at its lower end a frontwardly extending lug 67R of slide 68R. Pivotally mounted in socket 69 of slide 68F is a ciphering lever 71F which is urged in a counterclockwise or upward direction by means of its associated spring 72F. Ciphering lever 71R is similarly mounted on the slide 68R.

Figure 2:
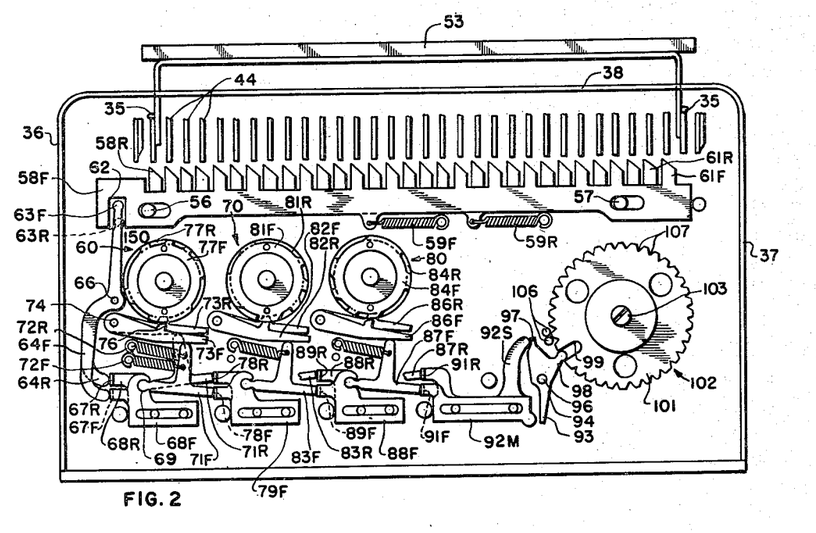
Fig. 2 is a fragmentary front elevational view particularly illustrating the operation of the selector mechanism of the type wheel printer.
Figure 3:
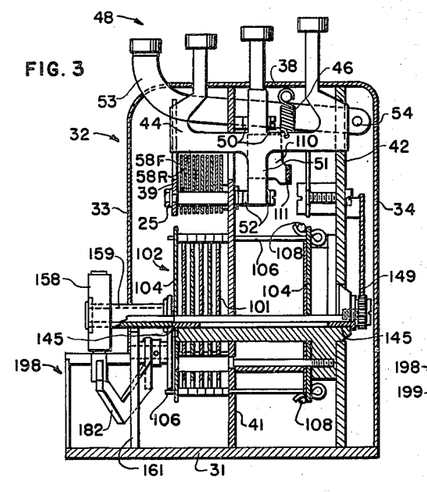
Fig. 3 is an end view of the apparatus taken on the line 3—3 of Fig. 1.
Figure 4:
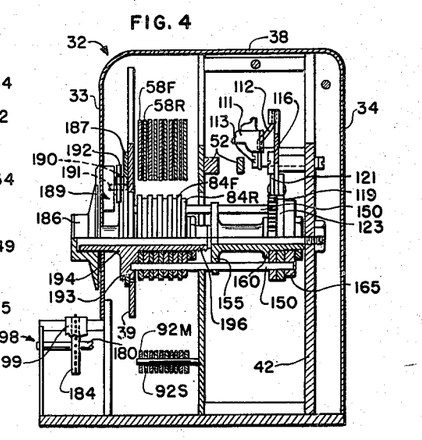
Fig. 4 is an end view of the apparatus taken on the line 4—4 of Fig. 1.

The position of the pairs of ciphering levers 71F, 71R are determined by the positions of associated pairs of sensing levers 73F, 73R which are pivoted at 74 and which by means of projections 76 sense the periphery of associated cam pairs 77F, 77R of code drums 60. Cam pairs 77F, 77R are so notched that the high parts of cam 77F of one pair are directly opposite the low parts or notches of the other cam 77R of the same pair. The periphery of the cam pairs 77F, 77R may be cut in a fortuitous manner. The just described cutting of the cam pairs insures that ciphering levers 71F, 71R of any pair of ciphering levers will always be oppositely positioned. The free end of ciphering lever 71F or 71R is designed to engage either the rearwardly extending lug 78F of slide 79F or the frontwardly extending lug 78R of slide 79R, depending upon the notching of the cam pairs 77F, 77R. Thus if ciphering lever 71F is down, as shown in Fig. 2, it will be in a position to engage a lug 78F of slide 79F. At this time ciphering lever 71R will be up or in a position to engage a lug 78R of slide 79R.

The second code drum 70 is composed of cam pairs 81F, 81R which by means of sensing levers 82F, 82R control the positions of ciphering levers 83F, 83R respectively mounted for pivotal movement on slides 79F, 79R. Likewise, a third code drum 80 composed of cam pairs 84F, 84R by means of sensing levers 86F, 86R, control the positions of ciphering levers 87F, 87R pivotally carried by their respective slides 88F, 88R. The free ends of ciphering levers 83F, 83R may engage either the rearwardly extending lug 89F of slide 88F or the frontwardly extending lug 89R of slide 88R. The free end of ciphering levers 87F, 87R may engage either the rearwardly extending lug 91F of marking slide 92M or the frontwardly extending lug 91R of spacing slide 92S. Marking slide 92M is designed to engage arm 93 of transfer lever 94 pivoted at 96, while spacing slide 92S is designed to engage arm 97 of transfer lever 94. Transfer lever 94 includes a rounded third arm 98, which is nested in notch 99 of an individual selector disc 101 of a five unit disc selector 102. Discs 101 are freely mounted on shaft 103. Movement of a marking slide 92M will, therefore, move an individual selector disc 101 to a marking position and movement of a ciphering slide 92S will move an individual selector disc 101 to its spacing position.

At right angles to and equally placed along the circumference of the selector disc 101 and guided in guide plate 104 (Fig. 3) are the usual stop pins 106. This type of five unit selector is well known in the art and is fully described in the patent of Morton et al. previously referred to above. When the V-shaped slots 107 of selector discs 101 adjacent a particular stop pin 106 are in alignment, this pin will pivot inwardly due to the force exerted by garter spring 108 and assume a position to stop movement of the type wheel stop arm 109 as will later appear.

It can now be readily seen that when a key slide 44 is depressed one of the operating levers 64F, 64R of each pair will pivot at 66 in a counterclockwise direction and at its lower end push against one of the slides 68F, 68R moving it to the right. The positions of ciphering levers 71F, 71R will determine which of the slides 79F, 79R will be operated, the position of ciphering levers 83F, 83R will determine which of the slides 88F, 88R will be operated, and the positions of ciphering levers 87F, 87R will determine whether a marking slide 92M or a spacing slide 92S will be operated to position the individual selector discs 101 accordingly. Since the code drums 60, 70, 80 are stepped to different positions as will later be described it is obvious that the path of movement afforded for each mechanical chain will vary with the setting of the code drums.

Figure 1:
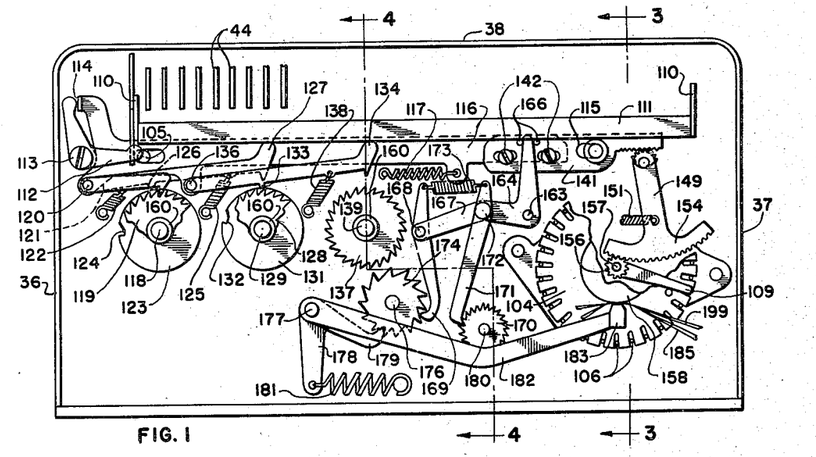
Fig. 1 is a fragmentary front elevational view particularly illustrating the functional operations of the type wheel printer.

Positioned below all the key slides 44 for engagement by any one of them, after selected permutation bars 58 have been moved to the left as previously explained, is a universal bar 111 (Fig. 1). The universal bar 111 is attached to end pieces 110 which are welded to the key slides 44 located at either end of the series of key slides. The key slides 44 which support the universal bar 111 will have all three upward projections 47 cut therefrom at 49 (Fig. 7) since in this case such projections are unnecessary. The universal bar 111 is normally held in an upward position by springs 46 which are provided on all key slides 44.

As the universal bar 111 moves downward when engaged by a particular key slide 44 it strikes the laterally extending arm of a bell crank 112 which is pivoted at 113. This causes the engagement of the upwardly extending arm of bell crank 112 with a bent over flange 114 of main operating slide 116, causing the slide 116 to move to the right as viewed in Fig. 1 against the tension of a relatively strong spring 117. The slide 116 is mounted for horizontal movement by means of pin and slot connections 105, 115.

The stepping of the code drums 60, 70, and 80 through actuation of the main operating slide 116 will now be explained. It should be mentioned that it is proposed that each code drum may be stepped to twenty-six different positions. The first code drum 60 is carried by sleeve 196 which is rotatably supported on fixed shaft 118 suitably attached to the rear supporting member 42. Integral with sleeve 196 is a raised annular disc 194 in which is seated dowel pins 150 which extend through flange 155 of a second sleeve 160 mounted for rotation on fixed shaft 118, through ratchet 119, through disc 123 and spacer 165. Thus when ratchet 119 is rotated cam pairs 77F, 77R of code drum 60 will be rotated therewith. The dowel pins 150 are removable and provide means whereby adjustment of the cam pairs may be made. It is to be understood that code drums 70 and 80 will be respectively mounted in a similar manner on fixed shafts 129 and 139. Pawl 126 is urged into engagement with the teeth of ratchet 119 by means of a spring 122. Mounted adjacent to ratchet 119 for movement therewith is the disc 123 having a deep notch 124. As ratchet 119 is stepped by pawl 121 due to the reciprocation of slide 116 a position will be reached whereat lug 126 formed as an integral part of a stepping pawl 127 pivoted at 120 will enter the notch 124 of disc 123 allowing this pawl to step ratchet 128, thereby causing movement of sleeve 196 and the consequent stepping of the five pairs of cams 81F, 81R comprising code drum 70.

Secured on a sleeve 160 rotatable on fixed shaft 129 is a disc 131 having a notch 132 which at one position in its rotation will be engaged by a lug 133 integral with stepping pawl 134 pivoted at 136 to the main operating slide 116. Pawl 134 is urged into engagement with the teeth of ratchet 137 by means of a spring 138. Ratchet 137 is secured on a sleeve 160 rotatably mounted on fixed shaft 139 and drives the five pair of cams 84F, 84R. The code drums may thus provide 17,576 (26 to the third power) key ciphering selections without repetition since there are 26 teeth in each of the ratchets 119, 128, and 137. Increasing the number of code drums and thus lengthening the chains would, of course, increase the number of key selections.

The operation of type wheel stop arm 109 will now be explained. The main operating slide 116 has secured thereto an adjustable plate 141 which is adjustable by means of screws 142. Formed as part of adjustable plate 141 is a rack portion 143 (Fig. 6) which is in engagement with a pinion 144 loosely mounted by means of a hub 146 to a shaft 148 suitably journaled on the supporting member 42 by bushing 147. Secured to shaft 148 is a gear segment 149 which is urged in a counterclockwise direction as viewed in Fig. 6 by means of a spring 151 which is weaker than the spring 117 that normally holds slide 116 to the right as viewed in the same figure. Carried by shaft 148 is a lug 152 which engages in a notch 153 on hub 146 and due to the force exerted by spring 151 on shaft 148, lug 152 normally tends to follow the movement of pinion 144 by its engagement in notch 153.

Gear segment 149 engages at its toothed portion 154 a pinion 156 attached to shaft 157 which is mounted in bushings 145. Shaft 157 carries type wheel 158 and stop arm 109, each being connected to the shaft 157 by means of sleeve 159. It should be noted that normally the force exerted by spring 117 on operating slide 116 through rack 143, pinion 144, gear segment 149, and pinion 156 holds stop arm 109 against a fixed stop member 162. This gearing arrangement just described which drive stop arm 109 is of a very high ratio so that a small movement of slide 116 enables a relatively greater movement of the stop arm which is capable of movement until blocked by any selected pin 106 as will now be described. By means of adjustable plate 141 the operative position of rack 143 with respect to pinion 144 may be varied.

The play allowed between lug 152 of shaft 148 and notch 153 of hub 146 insures that the stop arm 109 may move to any of its positions according to the selection of a particular stop pin 106 and still allow further movement of the main operating slide 116 to complete other functions. Thus when a key slide 44 is depressed and slide 116 moves to the left as viewed in Fig. 6, rack 143 will rotate pinion 144 counterclockwise causing notch 153 to tend to move away from lug 152. However, the force of spring 151 acting on gear segment 149 attached to shaft 148 enables the lug 152 to follow notch 153 until stop arm 109 encounters the selected stop pin 106. It should be remembered that universal bar 111 is not operated until a selection is made as has already been pointed out, and therefore, a stop pin 106 will be selected prior to movement of stop arm 109. When the stop pin 106 is encountered by stop arm 109 further movement of slide 116 to the left is permitted due to the play between lug 152 and notch 153. The amount of additional movement of slide 116 after a pin 106 is encountered is determined, of course, by which pin is selected. If the nearest pin to the stop arm 109 is selected there will be a maximum of further movement of slide 116, whereas if the furtherest pin 106 is selected there will be a minimum of additional movement.

A description of the printing and tape feeding tape operations will now be undertaken. Suitably pivoted at 163 to a fixed part of the apparatus is a bell crank 164 having an upstanding arm 165, the upper end of which rests between pins 166 attached to the main operating slide 116. To the laterally extending arm 167 of bell crank 164 is pivoted at 168 a pawl 169. Also carried by arm 167 of bell crank 164 is a tape stepping pawl 171 which is pivoted at 172. Pawls 169 and 171 are urged in opposite directions about their pivots by means of a connecting spring 173. Pawl 169 is provided for stepping ratchet 174 carried on the shaft 176. Attached to a suitably mounted rock shaft 177 is a bell crank 178 having an arm 179 which is urged into engagement with ratchet 174 by means of the spring 181. Also fixed to rock shaft 177 for movement therewith is the print hammer lever 182 carrying at its free extremity the usual printing element 183. Thus, as the main operating slide 116 moves to the right as viewed in Fig. 1 pins 166 carried thereby will cause a clockwise pivotal movement of bell crank 164 which thereby operates pawl 169 to step the ratchet 174. At this time arm 179 of the bell crank 178 is cammed outwardly tensioning the spring 181. As bell crank 164 reaches its extreme clockwise position, arm 179 now moves over a tooth of the ratchet 174 enabling spring 181 to move the print hammer lever 182 in a counterclockwise direction causing a sharp operation of the printing element 183. Immediately thereafter pawl 171 which has moved away from the tape feeding ratchet 170 engages the next tooth of ratchet 170 to thereby step the tape forward one position for the next operation. Ratchet 170 is secured to a shaft 180 which at its other end carries the tape feed wheel 184.

For setting the code drums 60, 70, and 80 to prearranged positions each of the shafts 118, 129, and 139 are provided with dials 186. To prevent tampering with the code drums after they have been set, plate 187 (Fig. 5) is mounted for vertical movement on pins 188. This is accomplished by means of a standard cylinder lock 189 (Fig. 5) which, when operated by a key, moves shaft 191 and eccentric 192 welded thereto in a counterclockwise direction. This lifts the plate 187 upwardly by means of slot 195 engaging hub 190 carried by plate 187, so that it becomes locked between the groove 193 of discs 194. Clearance, however, is provided so that discs 194 are free to rotate. Discs 194 are formed as integral parts of sleeves 196 which are rotatable on the shafts 118, 129, and 137 and carry respectively code drums 60, 70, and 80. Plate 187 includes bent over and rearwardly extending projections 197 which overlie the sensing levers 73, 82, and 86 and will disengage them from their respective code drums 77, 81, and 84 when the plate 187 is moved downward. This permits free access to and withdrawal of the code drums whenever necessary for adjustment or other purposes.

At the front of the housing 32 is mounted a compartment 198 (Figs. 3 and 4) which underlies the type wheel 158 and houses a tape feed wheel 184 and may include a tape guiding means (not shown) for tape 199. Means, not shown, will also be provided for feeding inking ribbon 185 in any conventional manner.

A brief résumé of the operation of the type wheel printer will now be given. Key slide 44 is depressed which through the five mechanical chains provided in the present invention results in the setting of the five individual selector discs 101 and the selection of a particular stop pin 106. The key slide 44 now engages universal bar 111 thereby operating bell crank 112 and moving the main operating slide 116 to the right as viewed in Fig. 1. This operates gear segment 149 causing rotation of stop arm 109 until it is stopped by a selected stop pin 106. Main operating slide 116 continues to move to the right, tensioning spring 181 of bell crank 178 and causing operation of print hammer lever 182 with a snapping action. As the main operating slide 116 returns to the left, pawl 171 operates tape feeding ratchet 170 to step tape 199 to its next position. At the same time pawl 169 assumes a position to engage the next tooth of ratchet 174.

Return movement of main operating slide 116 to the left causes pawl 121 to step ratchet 119 to its next position, and when the notch 124 of disc 123 is presented to lug 126 of pawl 127 this latter pawl will step ratchet 128 to its next position. Also when notch 132 of disc 131 is presented to lug 133 of pawl 134 this pawl will step ratchet 137 to its next position. Thus a continually changing path may be provided through the five mechanical chains to encipher or decipher each character of a message.

Space bar 53 is provided on either side with pins 35 which are each adapted to engage a key slide 44. Each of these latter key slides 44 will engage the same permutation bars 58F, 58R since the cam projection 61F, 61R carried thereby will be the same at these two points. A special code such as the "asterisk" character may be used to indicate spacing between words.

With reference now to Figs. 8 to 16, inclusive, the second embodiment of the invention which relates to a ciphering regenerative repeater will now be described. Numeral 226 represents the base of the apparatus which supports main upright members 227, 228, and a front panel plate 229. On the base 226 is mounted a suitable motor (not shown) which drives main shaft 231 having fixed thereto a gear 232 which is in mesh with gear 233 attached to stepped shaft 234. Mounted on shaft 234 is a selector cam sleeve 236 controlled by a friction clutch indicated generally as 237 and an operating sleeve 238 controlled by a ratchet clutch indicated generally as 239.

Suitably mounted to fixed parts of the apparatus is a selector magnet 241 and start magnet 242, either of which may release selector cam sleeve 236 by operation of clutch 237 depending on the direction of transmission of signals as will hereafter be explained. Armature 243 of selector magnet 241 is mounted on pivots 244 (only one of which is shown) and includes three arms, 246, 247, and 248. Arm 246 operable by a cam to be later identified acts as an armature assist lever to assist the armature in its operation to move toward the selector magnet 241 when marking or current impulses are received thereby. In a manner well known in the art. For biasing armature 243 in a clockwise direction as viewed in Fig. 9 a spring 249 is provided attached to arm 246. Arm 247 of armature 243 has connected thereto a screw 251 for operating clutch start pin 252. Arm 248 carries a screw 253 adapted to engage code sensing lever 254 which has formed thereon a lug 256 to be engaged on either side by the beveled edge 257 of locking lever 258 to be later described in more detail.

Start magnet 242 operates armature 259 about pivots 261 (Fig. 10) and includes two arms 262 and 263. Arm 262 carries a screw 264 adapted to engage clutch start pin 266. Arm 263 operable by a cam to be later identified acts as an armature assist lever to normally hold the armature 259 against the pole piece of start magnet 242 except when a space or starting impulse is received by this magnet. For normally biasing armature 259 in a counterclockwise direction spring 267 is provided and is attached to the arm 263.

Figure 10:
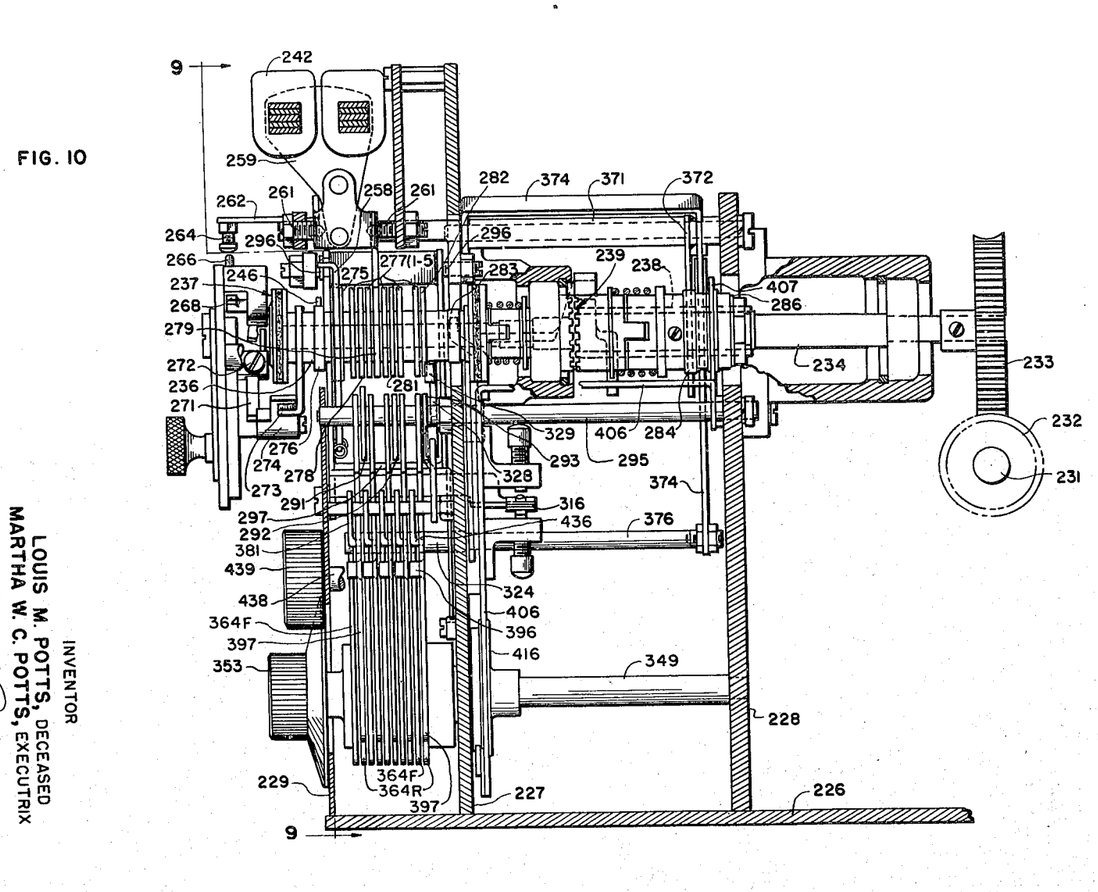
Fig. 10 is a section view approximately on line 10—10 of Fig. 9.

As already mentioned either selector magnet 241 or start magnet 242 may release clutch 237 depending on whether a start impulse is received by selector magnet 241 or start magnet 242 by operation of either start pin 252 or 266. This feature is fully disclosed in the aforementioned patent of L. M. Potts. Operation of either pin 252 or 266 (Fig. 10) causes movement of bell crank 268 on pivot 269 and a counterclockwise movement of lever 271 about the pivot 272. This frees stop arm 273 carried by selector cam sleeve 236 and causes the consequent release of the sleeve as the stop arm is now free to brush past the pivoted gate latch 274. Supported upon the selector cam sleeve 236, reading from left to right as shown in Fig. 10 and in detail in Figs. 12 to 15, inclusive, is armature assist cam 276 which is engageable by arm 246 of armature 243, locking lever cam 275, No. 5 code element cam 277—5, start cam 278, No. 4 code element cam 277—4, armature assist cam 279 engageable by arm 263 of armature 259, No. 3 code element cam 277—3, stop cam 281, No. 2 code element cam 277—2, No. 1 code element cam 277—1, direction switch cam 282 and clutch release cam 283 which releases operating sleeve 238 as later explained. Carried by operating sleeve 238 is a sensing cam 284 and a stepping cam 286.

Mounted about the pivot rod 287 (Fig. 9) are push levers 288 operable by the corresponding five code element cams 277—1 to 277—5, start cam 278, stop cam 281 and direction switch cam 282. Beneath the push levers 288 are arranged five slide code bars 289—1 to 289—5, inclusive, a start bar 291, stop bar 292 and a direction switch bar 293, all of which are urged in a leftward and upward direction about rod 295 by springs 294 as shown clearly in Figs. 12 to 15, inclusive. It it understood that the bars just described will be in aligned position with respect to the corresponding cams which have been previously described.

Figure 17:
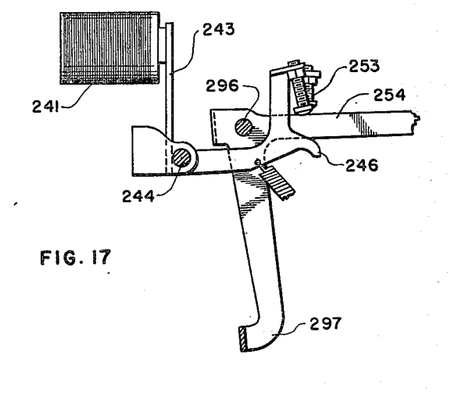
Fig. 17 is a detail view illustrating the operation of the armature of the selector magnet.

Code setting lever 254 (Fig. 17) which is pivoted about pivot 296 and operable by screw 253 carried by arm 248 of armature 247, includes a U-shaped bail 297, the cross piece of which underlies the code bars 289—1 to 289—5, start bar 291, stop bar 292, and direction switch bar 293. Bail 297 is adapted to cooperate with the notches 298 of code bars 289—1 to 289—5 to determine the direction in which the code bars will tilt when operated by their associated cams 277—1 to 277—5 and push levers 288 as will be later explained. Pivoted at 311 is a rock lever 312 having arms 313 and 314 which also underlie the code bars 289—1 to 289—5; start bar 291, stop bar 292 and direction switch bar 293. Arm 314 of lever 312 supports a regenerative repeater contact 316 and thus according to the direction in which code bars 289—1 to 289—5 will pivot, lever 312 will pivot in a like direction to thereby operate contact 316 to either its marking or spacing position. For retaining rock lever 312 in either of its positions, a jockey lever 317 pivoted at 318 and urged upwardly by spring 319 is provided. This lever has two notches 321 which cooperate with the knife edge of depending arm 322 of lever 312. Code bars 281—1 to 281—5 may either pivot in a counterclockwise direction about rod 295 or in a clockwise direction with bail 297 acting as a fulcrum when the bail 297 is in a position with its lower cross piece offset with respect to notches 298 of the code bar as will be later described in more detail.

Start bar 291 (Fig. 12) has formed near its left end an extra wide notch 320 so that regardless of the position of the bail 297 cam 278 will operate its associated push lever 288 and universally move cross bar 291 in counterclockwise direction about rod 295, resulting in a like movement of lever 312 and operation of the regenerative repeater contact 316 to its spacing position. Conversely, stop bar 292 has no notch formed thereon so that its cam 281 and its associated push lever 288 will universally cause stop bar 292 to pivot in a clockwise direction on bail 297 to accordingly move regenerative repeater contact 316 to its marking position. When cam sleeve 236 is released by operation of either start pin 252 or 266, start bar 291 will function at the commencement of each signal code combination to move the regenerative repeater contact 316 to its customary spacing or start position. At the end of each signal code combination stop bar 292 will function to move the regenerative repeater contact 316 to its customary marking or stop position.

When a spacing signal is received by selector magnet 241, bail 297 will pivot clockwise and move from beneath notch 323 of direction bar 293 (Fig. 15) causing the bar 293 to move in a clockwise direction on bail 297 as push lever 288 is operated by cam 282. This results in the operation of bell crank 324 on pivot 382 in a counterclockwise direction, enabling the bell crank 324 to push against flange 327 of direction slide bar 328. This moves direction slide 328 (Fig. 16) to the left causing its projection 329 to allow direction switch 331 to assume its leftward position.

When a spacing signal is received by start magnet 242, bail 297 will remain beneath the notch 323 allowing direction bar 293 to move in a counterclockwise direction and causing bell crank 332 which is pivoted at 382 to engage flange 334 of direction slide 322 and thereby enabling its projection 329 to move direction switch 331 to the right. The circuit with which direction switch 331 is associated will be later described. For retaining direction slide 328 in either of its positions there is provided a jockey lever 336 which is pivoted on rod 287 and urged in a clockwise direction by spring 337 into engagement with either of the notches 338 formed on direction slide 328.

Figure 11:
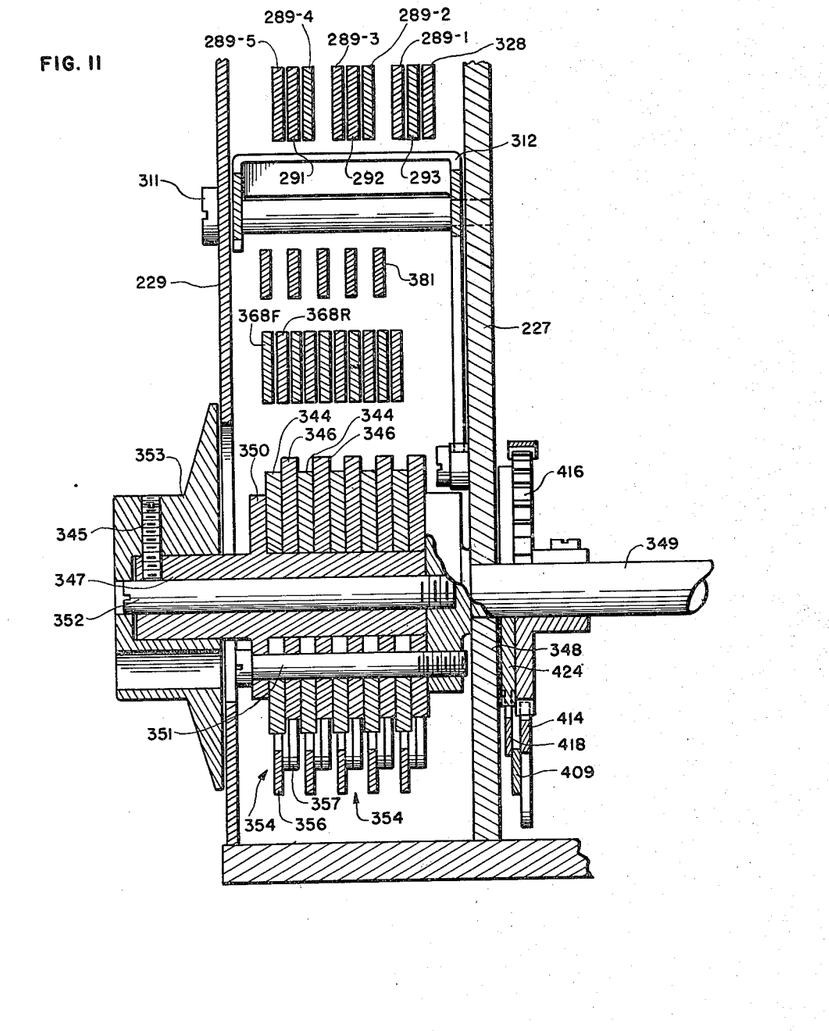
Fig. 11 is an enlarged sectional view of one of the ciphering code drums.
Figure 12:
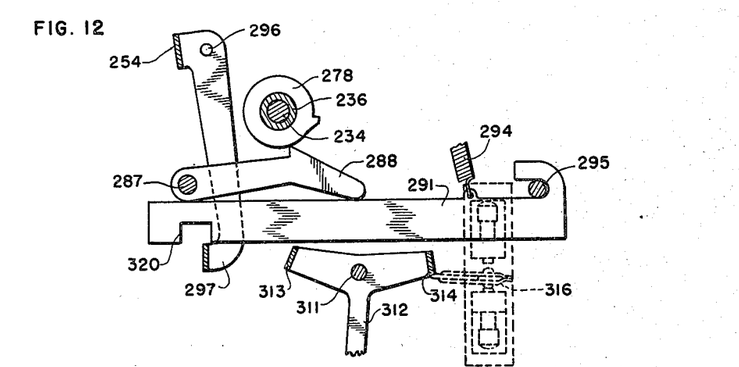
Fig. 12 is a detail view of the start bar.
Figure 13:
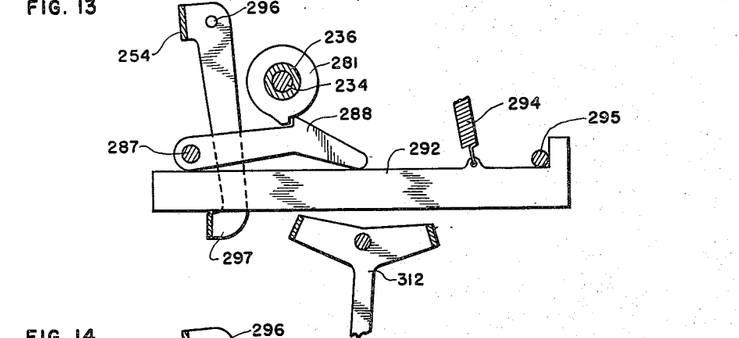
Fig. 13 is a detail view of the stop bar.
Figure 14:
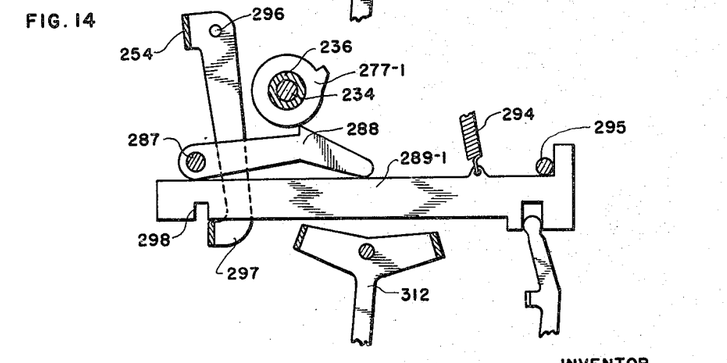
Fig. 14 is a detail view of one of the code bars.
Figure 15:
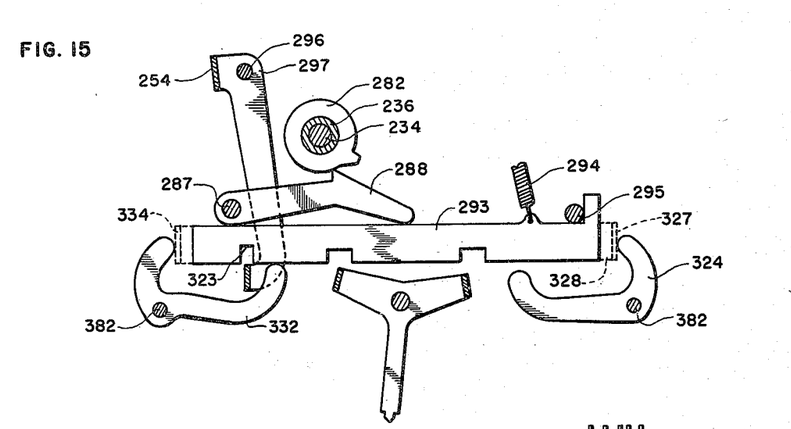
Figs. 15 and 16 are detail views of the mechanism for operating the direction switch.
Figure 16:
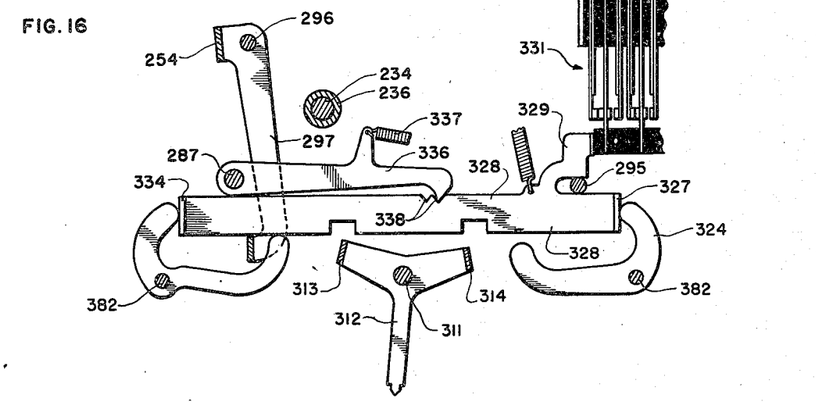

Located beneath code bars 289—1 to 289—5 are three code drums 341, 342, and 343. Each of the code drums are made up of five pairs of ciphering cams 344 and 346 (Fig. 11). Each of the code drums are mounted on a sleeve 347 which is attached to a flange 348 of rotatable shaft 349 by means of screws 351 and 352. The screw 351 which extends through a raised annular portion 350 of sleeve 347 is provided as a means of adjusting the angular position of the cam pairs 344, 346. Each set of code drums is provided with a dial 353 attached for movement with sleeve 347 by means of a set screw 345. By manipulation of dials 353 the code drums may be set to any desired position. By loosening screws 345 and 352 the code drums may be lifted up and withdrawn forwardly as a unit in order to make necessary adjustments.

For engaging each pair of ciperhing cams 344 and 346 there is provided a two part lever 354 (Fig. 9) made up of two links 356, 357 rigidly fastened together and pivoted at 355. Cam pairs 344 and 346 are so notched that when projection 358 of link 356 is engaging a high part of cam 344 projection 359 of link 357 is engaging a low part of cam 346. Conversely when projection 358 of link 356 is engaging a low part of cam 344 projection 359 of link 357 is engaging a high part of cam 346. Pivoted at 361 to each link 356 associated with the drum 343 is a single ciphering lever 362. Pivoted at 361 to each link 356 associated with the code drum 342 is a pair of ciphering levers 363F, 363R. Levers 363F constitute the front levers and levers 363R constitute the rear levers of any given pair of levers as viewed in Fig. 9. Similarly at 361 to each link 356 associated with the drum 341 is pivoted a pair of ciphering levers 364F, 364R.

Interposed between each ciphering lever 362 and each pair of ciphering levers 363F, 363R is a pair of slides 366F, 366R, which are slidably mounted on pins 367. Interposed between each pair of ciphering levers 363F, 363R, and 364F, 364R is a pair of slides 368F, 368R slidably mounted on pins 369.

The mechanism for operating the mechanical ciphering chains involved in the present invention will now be described. Pivotally secured to rod 371 is a sensing lever 372 having an arm 373 which acts as a follower for the sensing cam 284 previously described as being carried by operating sleeve 238. Also pivoted on rod 371 is a chain operating bail 374 which supports a cross rod 376. Sensing lever 372 and bail 374 are connected by means of a relatively strong spring 377. Bail 374 is further under the influence of a weaker spring 378 which normally urges the bail in a counterclockwise direction as viewed in Fig. 9. The purpose of the connecting spring 377 between sensing levers 372 and bail 374 is to provide yield in the parts if there is any tendency to jam.

Figure 9:
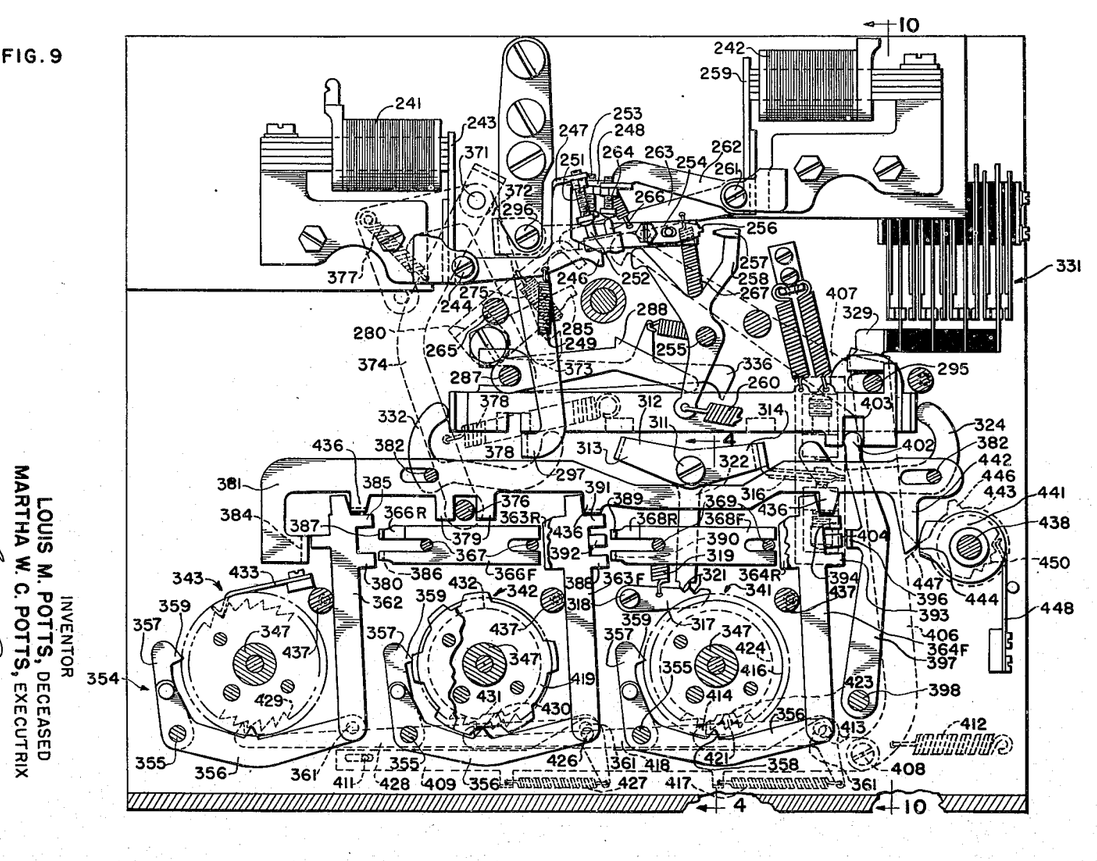
Fig. 9 is a fragmentary sectional view approximately on line 9—9 of Fig. 10.

Cross rod 376 of bail 374 extends between the projections 379 of a series of five slides 381, one for each element of the code, which are mounted on the pins 382. When the follower arm 373 of sensing lever 372 drops from the high part 383 of sensing cam 284, bail 374 may pivot in a counterclockwise direction under influence of spring 378 causing slides 381 to be pushed to the right and enabling the bent over flanges 384 formed thereon to push each mechanical ciphering chain to the right. The single ciphering lever 362, if in the up position as shown in Fig. 9, would push against rearwardly extending lug 386 of front slide 366F by means of its own projection 380. If ciphering lever 362 is down it will push against frontwardly extending lug 387 of rear slide 366R by means of its projection 385. Thus, either the front or rear slide of each pair of slides 366F, 366R may be operated. If front slide 366F is operated it will push against ciphering lever 363F regardless of its position. Likewise, if the rear slide 366R is operated it will push against ciphering lever 363R.

When ciphering lever 363F is up as shown in Fig. 9 and it is moved to the right by slide 366F it will engage by means of projection 388 the frontwardly extending projection 389 of front slide 368F. When ciphering lever 363F is down it may push against lug 389 of slide 368R by means of its projection 391. Similarly the single projection 392 of ciphering lever 363R may engage either rearwardly extending lug 390 of front slide 368F or lug 389 of rear slide 368R.

If front slide 368F is moved to the right it will engage ciphering lever 364F regardless of its position and accordingly move lever 364F to the right. If ciphering lever 364F is up as shown in Fig. 9 its projections 393, 394 will miss bent over flange 396 of code bar operating lever 397, pivoted about rod 398. Each lever 397 terminates in a rounded portion 402 at its free end which is nested in notches 403 formed near the right end of the code bars 289—1 to 289—5. When ciphering lever 364F is down its projection 394 will engage flange 396 of lever 397 and will thereby cause a particular code bar 289—1 to 289—5 to be moved to the right, whereas previously the code bar was permitted to remain in its leftward position.

When rear slide 368R is moved to the right it will engage the rear ciphering lever 364R, which according to its position may either engage, by means of its single projection 404, flange 396 of lever 397 and move a corresponding code bar 289—1, 289—5 to the right when ciphering lever 364R is in its up position or on the other hand when rear ciphering lever 364R is down its projection 404 will miss flange 396 of lever 397 and enable the particular code bars 289—1 to 289—5 to remain in a leftward position. Therefore, when slides 381 are moved to the right a variable path of movement through the five mechanical chains will be provided and code bars 289—1 to 289—5 will be positioned accordingly for each signal code combination. As slides 381 move to the right they push ciphering levers 362 and selected ones of the ciphering lever pairs 363F, 363R and 364F, 364R also to the right. On return movement of slides 381 to the left lugs 436 formed on the lower part of slides 381 function to return the ciphering levers to their original position. The ciphering levers are normally retained against adjustable eccentric stops 437.

The stepping of the code drums to provide this variable path will now be explained. For stepping code drums 341, 342, and 343 to their various positions there is provided a long lever 406 (Fig. 10) which is pivoted about the rod 295. Lever 406 includes a follower arm 407 which engages the stepping cam 286 carried by sleeve 238 as described earlier in the specification. Pivotally connected at 408 (Fig. 9) to lever 406 is a slide lever 409 which at its left end is mounted upon pin 411. A spring 412 normally urges lever 406 in a counterclockwise direction as viewed in Fig. 9 about the rod 295. Pivoted at 413 is a stepping pawl 414 adapted to engage the ratchet 416 attached to shaft 349 to step code drum 341 each time slide 409 is reciprocated. Pawl 414 is normally urged into engagement with the teeth of the ratchet 416 by means of a spring 417. Also pivoted at 413 on slide 409 is a longer pawl 418 adapted to engage ratchet 419 which steps the code drum 342. This occurs when a projection 421 formed on pawl 418 engages the notch 423 of disc 424 fixed for rotation with ratchet 416.

Pivoted at 426 on slide 409 and normally urged in a counterclockwise direction by spring 427 is pawl 428 adapted to engage the teeth of the ratchet 429 which rotates the code drum 343. Formed on the pawl 428 is a projection 430 designed to enter a notch 431 of a disc 432 which is rotatable with the ratchet 419. Thus, whenever projection 421 is presented to the notch 423 of disc 424 code drum 342 will be stepped one position, and likewise when projection 430 is presented to the notch 431 of disc 432 code drum 343 will be stepped one position. This arrangement is similar to a numbering stamp system and provides a large number of ciphering selections without repetition. For maintaining ratchets 416, 419, and 429 in position, they may be provided with a jockey spring 433, only one of which is shown in the drawings in Fig. 9.

Fixed to a shaft 438 suitably journaled between front panel member 229 and upright support 227 is a dial 439 having four different positions of adjustment. Shaft 438 carries the cam 441 having a high part adapted to engage a downwardly extending projection 442 of one of the slides 381. Shaft 438 also carries a cam 443 having a projection 444 for the No. 1 position of dial 439 and a projection 446 for the No. 4 position of dial 439. The high part of cam 441 is effective in either the No. 1 or No. 2 position of dial 439 to hold one of the slides 381 to the left. Movement of one of the slides 381 to the left moves all of the slides to the left because of their common engagement with cross rod 376 of bail 374. High parts 444 and 446 of cam 443 are effective to push against projection 447 of stepping lever 406 to pivot it in a clockwise direction on rod 295 and render it ineffective for accomplishing the stepping of code drums 341, 342, and 343. Therefore, in the No. 1 position of dial 439 as shown in Fig. 9 all code bars 289—1 to 289—5 will remain stationary in their leftward position and the apparatus may function as a regular regenerative repeater without enciphering or deciphering signals. Also in this position no stepping of the code drums will occur. In the No. 2 position of dial 439 code bars 289—1 to 289—5 will remain stationary but stepping of the code drums will occur as this may be desirable under some conditions from an operating standpoint. In the No. 3 position of dial 439 which is the normal position of operation, stepping lever 406 and code bars 289—1 to 289—5 will be freed for operation. In the No. 4 position of dial 439 code bars 289—1 to 289—5 will be permitted to operate but stepping lever 406 will be disabled providing a fixed key ciphering arrangement. For holding dial 439 in each of its four positions shaft 438 is provided with a ratchet 450 engageable by a spring detent 448.

Figure 18:
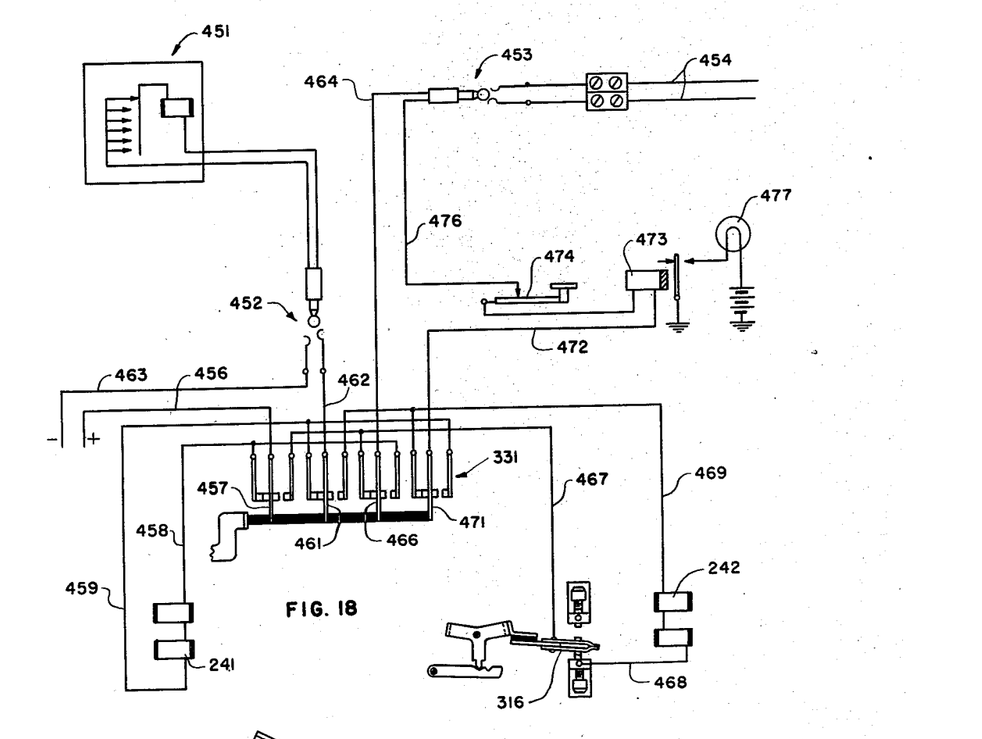
Fig. 18 discloses a circuit arrangement for use with the ciphering regenerative repeater.

With reference now to Fig. 18 a circuit designed for use with the ciphering regenerative repeater will now be described. Numeral 451 represents a combined telegraph transmitting and receiving apparatus located at a local station which by means of plug connections 452 and 453 may be associated with a loop line 454 extending to a similar apparatus at a distant station having an identical ciphering regenerative repeater and circuit arrangement. A similar circuit is shown in the patent of L. M. Potts already mentioned above.

Switch 331 whose operation has been previously described is shown in its leftward or transmitting position. Under this condition the following circuit may be traced: From positive lead 456 through contact 457, over conductor 458, through selector magnet 241, over conductor 459, through contact 461 to one side of the plug connection 452 connected to apparatus 451, to the other side of connection 452 and to negative lead 463. Another circuit is traceable as follows: From one side of loop line 454 through connection 453, over conductor 464, through contacts 466, over conductor 467, through regenerative repeater contact 316, over conductor 468, through start magnet 242, over conductor 469, through contact 471, over conductor 472, through the winding of the slow to release relay 473, through break key 474, over conductor 476, through connection 453 to the other side of loop line 454. Thus when switch 331 is in its leftward position apparatus 451 will be in circuit with selector magnet 241 while regenerative repeater contact 316 and start magnet 242 will be in circuit with the distant station.

When a start impulse is received by start magnet 242 as explained, switch 331 will move to the right and the following circuit will be established, from positive lead 456 through contact 457, over conductor 467, through regenerative repeater contact 316, over conductor 468, through start magnet 242, over conductor 469, through contact 461, over conductor 462 to an obvious circuit extending to apparatus 451. The following circuit is also established, from conductor 472 extending to one side of loop line 454 as previously described, through contact 471, over conductor 459, through selector magnet 241, over conductor 458, through contact 466, and over conductor 464 to the other side of loop line 454 as explained. Therefore, selector magnet 241 is now placed in the circuit extending to the distant station while regenerative repeater contact 316 and start magnet 242 are placed in circuit with apparatus 451. Break key 474 is provided in order to deenergize slow to release relay 473 at both the local and distant station and to thereby light warning lamp 477 whenever necessary under operating conditions.

The ciphering regenerative repeater herein disclosed includes an orienting mechanism indicated generally as 481 which is well known in the art and is disclosed in the patent of Morton et al., No. 1,904,164. This is for the purpose of orienting cam sleeve 236 with signals received by selector magnet 241.

In order that the invention may be better understood a cycle of operation will now be described. First it will be assumed that dial 439 is set to the No. 3 or normal operating position. Upon receipt of the start impulse by either the selector 241 or start magnet 242 clutch 237 will be operated and sleeve 236 released for rotation. If the start impulse is received by selector magnet 241 direction switch 331 will be set in its leftward position, but if the start impulse is received by start magnet 242 direction switch 331 will move to its rightward position. Start bar 291 will cause operation of regenerative repeater contact 316 to its spacing position. Armature assist arm 246 of armature 243 through operation of cam 276 will move the armature 243 towards selector magnet 241 during receipt of each impulse of the signal code combination and during the stop impulse which is always a marking or current impulse. Armature assist arm 263 of armature 259 will move this armature against the pole piece of start magnet 242 except when it should be receiving a spacing or start impulse. After receipt of each impulse of the five unit code combination, locking lever 258 which is pivoted at 255 and urged in a counterclockwise direction by spring 260 functions by means of its knife edge 257 to engage lug 256 of sensing lever 254 which carries the bail 297. This temporarily holds sensing lever 254 and bail 297 which is an integral part thereof in either its marking or spacing position depending upon the impulse received by selector magnet 241. Code bars 289—I to 289—5 will be operated sequentially by the push levers 288 which are acted upon by their respective cams 277—I to 277—5.

When bail 297 (Fig. 14) underlies notch 298 of a particular code bar 289—I to 289—5, regenerative repeater contact 316 will be moved to its spacing position. When the position of bail 297 is offset with respect to the position of notches 298 of code bars 289—I to 289—5, regenerative repeater contact 316 will be moved to its marking position. At the end of each signal code combination stop bar 292 (Fig. 13) is operated by cam 281 and its push lever 288 to move regenerative repeater contact 316 to its spacing position.

Figure 19:
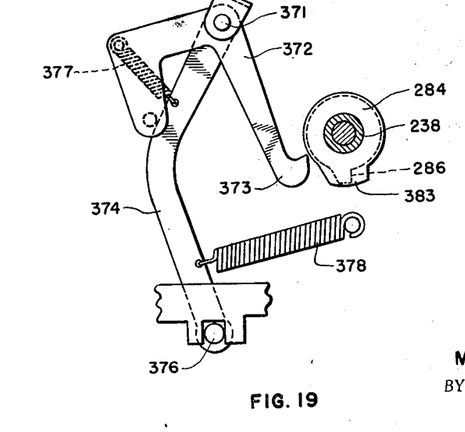
Fig. 19 is a detail view of part of the mechanism used for positioning the code bars.

Approximately during the latter part of the receipt of the No. 5 impulse by selector magnet 241 clutch release cam 283 moves arm 285 (Fig. 9) of clutch release lever 280 about pivot 285 against the tension of spring 275. This enables release of the clutch 239 and consequent rotation of operating sleeve 238. Shortly after release of sleeve 238 lever 372 (Fig. 19) rides on the high part 383 of cam 284 and since spring 377 is stronger than spring 378 bail 374 is pivoted in a clockwise direction. This returns slides 381 to the left insuring that ciphering lever 362, slides 366F, 366R, ciphering levers 363F, 363R, slides 368F, 368R and ciphering levers 364F, 364R are moved to the left. As lever 372 drops from the high part 383 of cam 284, spring 378 will move slides 381 to the right, positioning code levers 289—I to 289—5 in their new ciphering positions. Prior to this movement of slides 381 to the right stepping lever 406 operable by cam 286 of sleeve 238 steps code drums 341, 342, and 343 to the next position to afford new ciphering paths through the mechanical chains.

Dials 353 are provided with apertures 481 through which may be viewed alphabetical designations printed on the front panel plate 229 for setting the code drums to prearranged positions.

It is understood that various changes and modifications may be made in the present invention without departing from the spirit and scope thereof.

What is claimed is:

1. A mechanical ciphering selector comprising a plurality of selectable elements, means selected by said selectable elements for controlling selective operations, a mechanical chain for each of said selectable elements including a series of pairs of movable members, means for selectively conditioning said movable members by variably selecting the positions of each member of said pairs of said members to afford a variable path of movement through said chains, a plurality of pairs of selector bars, and a plurality of pairs of operating levers effective when actuated by said selector bars to operate said selectable elements according to the path of movement afforded by the selective conditioning of said mechanical chains.

2. A mechanical ciphering selector comprising a plurality of selectable elements, means selected by said selectable elements for controlling selective operations, a mechanical chain for each of said elements, each chain including a series of pairs of variably positionable members, means including a plurality of variably settable code drums for selectively conditioning said members by variably selecting the positions of each member of said pairs of members to afford a variable path of movement through said chains, a plurality of pairs of selector bars, and a plurality of pairs of operating levers effective when actuated by said selector bars to operate said selectable elements according to the path of movement afforded by the selective conditioning of said mechanical chains.

3. A mechanical ciphering selector comprising a plurality of selectable elements, means selected by said selectable elements for controlling selective operations, a mechanical chain for each of said elements, each chain including a series of pairs of movable members, each member having pivotally articulated thereto a ciphering lever, a sensing lever associated with each ciphering lever, a plurality of variably settable code drums effective through said sensing levers and said ciphering levers to selectively condition said movable members by variably selecting the positions of each member of said pairs of movable members to afford a variable path of movement through said chains, a plurality of pairs of selector bars, and a plurality of pairs of operating levers effective when actuated by said selector bars to operate said selectable elements according to the path of movement afforded by the selective conditioning of said mechanical chains.

4. A mechanical ciphering selector comprising a plurality of selectable elements, means selected by said selectable elements for controlling selective operations, a mechanical chain for each of said selectable elements including a series of pairs of movable members, each member having associated therewith ciphering instrumentalities, a plurality of variably settable code drums effective through said ciphering instrumentalities to selectively condition said movable members by variably selecting the positions of each member of said pairs of movable members to afford a variable path of movement through said chains, a plurality of pairs of selector bars, and a plurality of pairs of operating levers effective when actuated by said selector bars to operate said selectable elements according to the path of movement afforded by the selective conditioning of said mechanical chains.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
| --- | --- | --- |
| 1,527,768 | Anning | Feb. 24, 1925 |
| 1,621,290 | Tanner | Mar. 15, 1927 |
| 2,394,765 | Hagelin | Feb. 12, 1946 |
| 2,403,679 | Potts | July 9, 1946 |